July 15, 1924.
E. SCHORR
VEHICLE SPRING SUSPENSION
Filed April 21, 1921
1,501,891
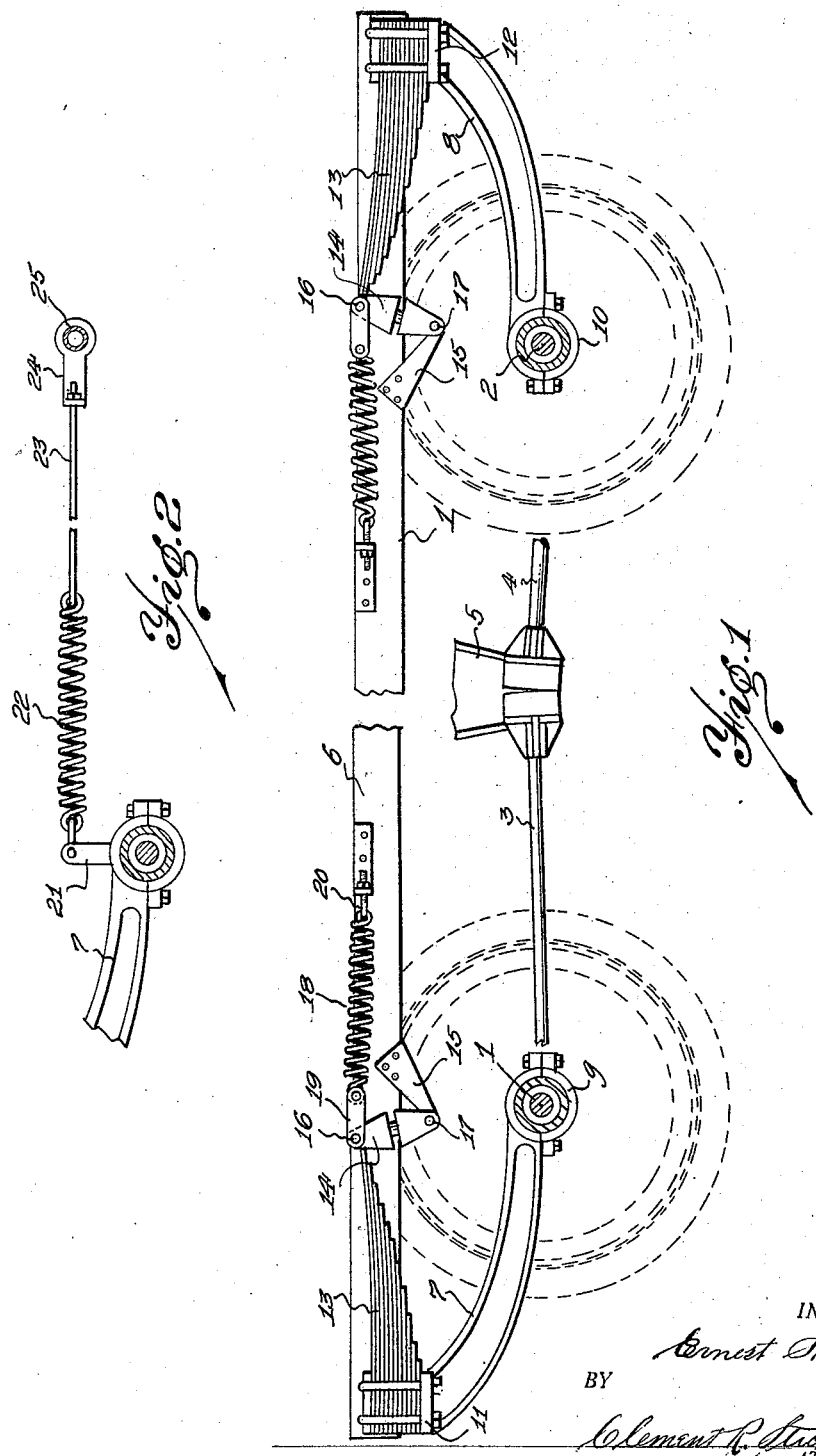
INVENTOR.
Ernest Schorr
BY
Clement R. Stickney
ATTORNEY.

Patented July 15, 1924.

1,501,891

UNITED STATES PATENT OFFICE.

ERNEST SCHORR, OF DETROIT, MICHIGAN; FLORA V. KYTE, ADMINISTRATRIX OF SAID ERNEST SCHORR, DECEASED, ASSIGNOR TO SCHORR MOTOR VEHICLE COMPANY, A CORPORATION OF DELAWARE.

VEHICLE SPRING SUSPENSION.

Application filed April 21, 1921. Serial No. 463,204.

*To all whom it may concern:*

Be it known that I, ERNEST SCHORR, a citizen of the United States, residing at Detroit, in the county of Wayne and State of Michigan, have invented certain new and useful Improvements in Vehicle Spring Suspensions, of which the following is a specification.

This invention relates to spring suspension for motor vehicles of a type whereby violent oscillations of the axle are so resisted that the chassis moves slightly, if at all, while minor vibrations are taken care of in a manner that permits the use of solid tires instead of pneumatic, if desired.

The invention consists in the matters hereinafter set forth and more particularly pointed out in the appended claims.

In the drawings:
Fig. 1 is a view in side elevation, partially broken away, of a motor vehicle provided with a spring suspension that embodies features of the invention; Fig. 2 is a view in detail of a modification of the device.

As herein shown in preferred form, a pair of axles 1 and 2 are held in parallel spaced relation by inwardly extending distance rods 3 and 4, the inner end portions of which abut and are arranged to pivot or rock on each other, they having a suitable pivot connection with hangers 5 depending from the main chassis frame 6 and being arranged in any convenient manner at this point of connection so as to turn freely or oscillate on their axes and thus permit angular movement of the axles in relation to the frame. Any suitable arrangement may be employed to produce this pivot connection, a simple arrangement being that disclosed in my companion application, filed concurrently herewith, Serial No. 463,203.

Outwardly extending pairs of arms 7 and 8 from the respective axles, on which they are pivotly connected, as by split collars 9 and 10, are arranged at the outer end portions with spring perches 11 and 12. Inwardly extending spring arms of the usual leaf type, as indicated at 13, are connected by shackles 14 to hangers 15 depending from the chassis, the parts being so disposed that the pivot connection 16 of the spring with the shackle is outside the vertical line passing through the pivot point 17 where the shackle is articulated to the hanger 15.
To resist the movement of the shackle outwardly, a tension spring 18 is linked thereto as indicated at 19 and the inner end thereof is connected as by an adjustable turn buckle or eye bolt 20 to the chassis.

As a result of this construction, any load on the chassis which depresses the springs 13 and tends to cause the arm 7 to rock downwardly, likewise tends to move the shackle 14 outwardly and this is resisted by the springs 18. As a result, the chassis frame 6 maintains its level or normal position, regardless of violent shocks imparted to the axles, within, of course, the range of action of the springs. The placing of the spring support well toward the middle of the chassis frame and the extension of the spring seat arms outwardly from the axle together with the pivoting of the perch arms on the axles, minimizes the effect of the oscillations of the axles in relation to the chassis.

In a modification of the device indicated at Fig. 2, the arm 7 is provided with an upwardly extending member 21 from which a tension spring 22 extends through connections 23 and 24 to a cross rod or anchor bar 25 in the middle of the chassis.

Obviously changes in the detail of the construction may be made without departing from the spirit of the invention and I do not care to limit myself to any form or arrangement of parts.

What I claim is—

1. A combination of a vehicle frame and axles therefor with pairs of inwardly extending distance rods pivotally connected to the axles and to the frame and in abutting relation, perch arms carried by the axles, inwardly extending spring arms each secured at the outer end to a perch arm and shackled at the other end to the chassis, and springs in tension operatively connecting the chassis frame and perch arms and effective to resist downward movement of the perch arms.

2. A combination of a vehicle frame and axles therefor with pairs of inwardly extending distance rods pivotally connected to the axle and to the frame in abutting relation, outwardly extending perch arms pivoted to the axles, spring arms each rigidly secured at one end to a perch arm, a shackle pivoted to the frame and to the otherwise free end of a spring arm and a spring in tension operatively connecting the frame and a perch arm for resisting downward movement of the perch arm around the axis of the axle.

3. A combination of a vehicle frame and axles therefor with inwardly extending distance rods pivotally connected to the axles and to the frame in abutting relation, outwardly extending perch arms pivoted to the axles, inwardly extending spring arms each rigidly secured to the outer end of a perch arm, shackles each pivoted to a spring arm and to the frame and springs each operatively connected to a perch arm and to the frame for resisting downward movement of the perch arm around its pivot center.

4. In combination, a vehicle frame, and axles therefor connected by distance rods, and means for operatively connecting the frame and axles, said means including a perch-arm assembly pivotally mounted on an axle and extending outwardly therefrom, said assembly including a leaf spring formation having its free end in juxtaposition to a vertical plane through the axle, a shackle formation connecting the frame and such spring free end, and a resisting element of tension characteristic operatively connecting the frame and arm assembly and active to resist downward movement of the arm assembly about its pivot.

In testimony whereof I affix my signature.

ERNEST SCHORR.